United States Patent
Neu

[15] 3,707,701
[45] Dec. 26, 1972

[54] DEVICE FOR MEASURING CHANGES IN RADIUS OF RUBBER TIRED VEHICLE WHEELS

[72] Inventor: Wallace I. Neu, 1601 N. 5th Street, Alpine, Tex. 79830

[22] Filed: Feb. 18, 1971

[21] Appl. No.: 116,353

[52] U.S. Cl.....................................340/58, 73/146.2
[51] Int. Cl..............................................B60c 23/06
[58] Field of Search.............340/58; 73/146.2, 146.5

[56] References Cited

UNITED STATES PATENTS

| | | | |
|---|---|---|---|
| 3,581,277 | 5/1971 | Beatty, Jr. et al. | 340/58 |
| 3,613,075 | 10/1971 | Griffiths et al. | 340/58 |
| 3,588,814 | 6/1971 | Furlong | 340/58 |

*Primary Examiner*—John W. Caldwell
*Assistant Examiner*—Glen R. Swann, III
*Attorney*—Sughrue, Rothwell, Mion, Zinn & Macpeak

[57] ABSTRACT

A system for detecting a change in the effective radii of rubber tired wheels mounted on vehicles with the vehicle in motion. The number of complete rotations made by a monitored wheel is detected and compared with a reference to determine the time interval defined as the time required for the monitored wheel to move from an in phase condition, out of phase, and back into phase again with respect to the reference. A wheel is in phase with its reference when both simultaneously produce a pulse signal. When this time period is less than a predetermined time interval, a warning signal is sent to the vehicle operator.

8 Claims, 8 Drawing Figures

START

X REVOLUTIONS    $X + \frac{1}{3}$ REVOLUTIONS

2X REVOLUTIONS    $2X + \frac{2}{3}$ REVOLUTIONS

3X REVOLUTIONS    $3X + 1$ REVOLUTIONS

INVENTOR
WALLACE I. NEU

BY Sughrue, Rothwell, Mion, Zinn & Macpeak
ATTORNEYS

DEVICE FOR MEASURING CHANGES IN RADIUS OF RUBBER TIRED VEHICLE WHEELS

BACKGROUND OF THE INVENTION

The invention pertains to systems for monitoring changes in radii of rubber tired vehicle wheels mounted on a vehicle in motion. A wheel's radius may change in response to various condition changes such as loss of air pressure, excessive weight over an axle to which the wheel is attached, and the wearing down of the rubber which constitutes the tire mounted on the wheel. Prior devices for determining that a tire on a vehicle has lost air or that the tire, by some other cause, has attained a dangerous condition, require that an active device be attached to and ride with the rotating portion of the wheel. These systems also have a problem in transferring the information acquired by the active device to the portion of the vehicle stationary with respect to the rotating wheel. The system disclosed herein detects a change in the effective tire radius while the vehicle is in motion with either no devices or a passive device attached to the rotating portion of the wheel thus permitting the vehicle operator ample time to move off the road and make necessary repairs. The effective radius is the distance between the wheel center and the road surface. In that a dangerous condition is indicated before the condition becomes critical, not only can the tire often be saved but accidents can be prevented.

SUMMARY OF THE INVENTION

The invention pertains to a system for detecting changes in the radii of rubber tired vehicle wheels mounted on a moving vehicle. The system includes means for continuously monitoring the rotation of the wheels, the number of rotations being an indication of radius, and comparing the rotations with a reference. Three comparing techniques are disclosed.

In accordance with one technique, when the radius of a monitored wheel changes by a predetermined amount, as indicated by a corresponding change in the time interval defined as the time for a monitored wheel to move from an in phase condition, out of phase and back into phase again, with respect to a reference source, a warning signal is sent to the driver. Upon receipt of the warning signal the driver can pull off the road and inspect the monitored wheels to determine the defect and take the necessary action to alleviate the defective condition.

A wheel is said to be in phase with its reference when both simultaneously produce a pulse signal. A pulse producing means is mounted on a nonrotating portion of each wheel being monitored. Activation means are mounted on the rotating portion of each wheel such that pulses are produced in proportion to the number of wheel revolutions. For example, one pulse may be produced for each revolution. The phasing time is then measured.

In accordance with another technique, the actual number of rotations which a wheel makes over a predetermined time interval is calculated and compared with a reference count. If the measured count falls outside a predefined limit a warning signal is generated.

A third technique measures the actual speed of each monitored wheel and compares it with a reference.

DETAILED DESCRIPTION OF THE PREFERRED EMBODIMENTS

Figure 1A:
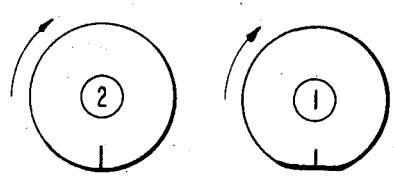
FIGS. 1a–1d illustrate the rotation of two wheels on a vehicle during the synchronizing time interval.
Figure 1B:
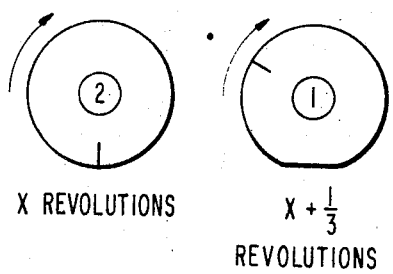
Figure 1C:
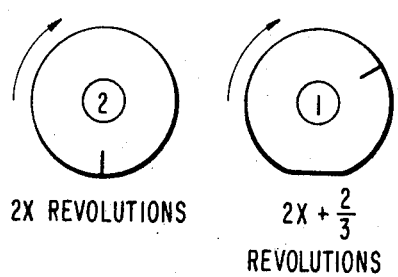
Figure 1D:
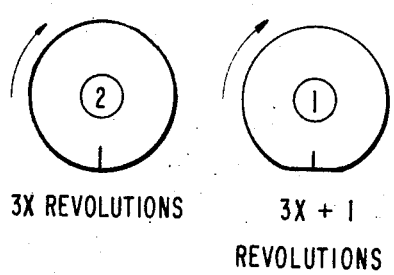

Two rubber tired wheels mounted on the same vehicle do not normally rotate in perfect coincidence. Random variations such as air pressure differences, road curves and irregularities, and variations in tread depth cause each tire on a moving vehicle to make a different number of revolutions over an equal time interval. Thus, over the time it takes one wheel to make, for example, 20 revolutions, another wheel on the same vehicle may have gone through 20.5 revolutions. Let it be assumed that a vehicle is initially at rest. Let a reference mark be placed at the point on each of two tires in contact with the road surface. This is illustrated in FIG. 1a. When the vehicle is caused to move, wheel number 1 may move through a greater number of rotations than wheel number 2. For the purposes of illustration only, FIG. 1b shows that after wheel 2 has rotated through X complete revolutions, wheel 1 has rotated X + ⅓ revolutions. After wheel 2 has rotated 2X revolutions, wheel 1 has rotated 2X + ⅔ revolutions. This is illustrated in FIG. 1c. After 3X revolutions of wheel 1, wheel 2 has rotated through 3X + 1 revolutions, bringing wheels 1 and 2 back into phase (FIG. 1d). It is to be understood of course that the actual number of revolutions required to bring two initially in phase wheels back into phase again depends upon various factors such as wheel size, vehicle speed, relative air pressure, road configuration and relative tread depth.

It has been determined that under normal driving conditions, two equal radius wheels on a moving vehicle will return to an in phase position every T seconds, where T varies from between 20 seconds to 120 seconds. The time T will be called the phasing time. It has also been determined that nothing is apt to be seriously wrong with the rubber tired wheels unless the wheels return to an in phase position once every ten seconds or less. Phasing times of less than 10 seconds indicate that the relative radius of one of the wheels is so substantially less than its corresponding wheel that there is a good likelihood that the wheel is in a dangerous condition. In accordance with a teaching of this invention, two wheels are coupled such that each may be used as a reference source for the other, and when the phasing time reaches 10 seconds or less, or any other predetermined phasing time as required, a warning signal is generated to indicate that a visual inspection of the wheels should be made. Since the warning signal is generated while the vehicle is in motion and before the dangerous condition becomes critical, the vehicle driver can take proper action in time to avoid an accident or damage due to the failure of one of the rubber tired wheels.

Figure 2:
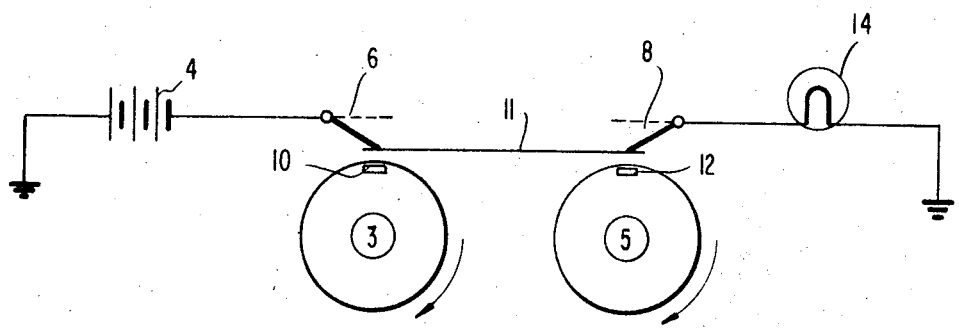
FIG. 2 illustrates one embodiment of this invention.

FIG. 2 illustrates one embodiment of the invention using the phasing technique. Wheels 3 and 5 may correspond to the front and rear wheels on the same side of a vehicle. Pulse producing means 6 and 8, shown as switches, are mounted on a fixed portion of wheels 3 and 5 respectively, such that they will be closed once each revolution of the wheels by activation means 10 and 12. Activating means 10, 12 may be magnets while pulse producing means 6 and 8 may be reed switches. However, any other means for producing pulses proportional to the number of wheel revolutions may be used. For example, some vehicle wheels have ridges or fins formed on the outside of their brake drums. These fins form natural activation means. The pulse producing means may then be a permanent magnet and coil which yields a pulse each time one of the fins passes the magnet. Conductor 11 couples switches 6 and 8 such that when switches 6 and 8 are closed simultaneously, current flows from source 4 to lamp 14. Thus each time the wheels are in phase, the light is energized. However, when the wheels are not in phase, only one of the switches will be closed at a time, thereby blocking energization of lamp 14. By monitoring the time interval, that is the phasing time, between successive lamp lightings, a measurement can be made of the relative radius of the two tires. Under normal conditions, lamp 14 may blink in time intervals of once every 20 seconds or greater. However, when the lamp blinks in 10 second intervals or less, one of the wheels may be in defective condition. When this occurs, the vehicle should be stopped and the wheels examined.

Figure 3:
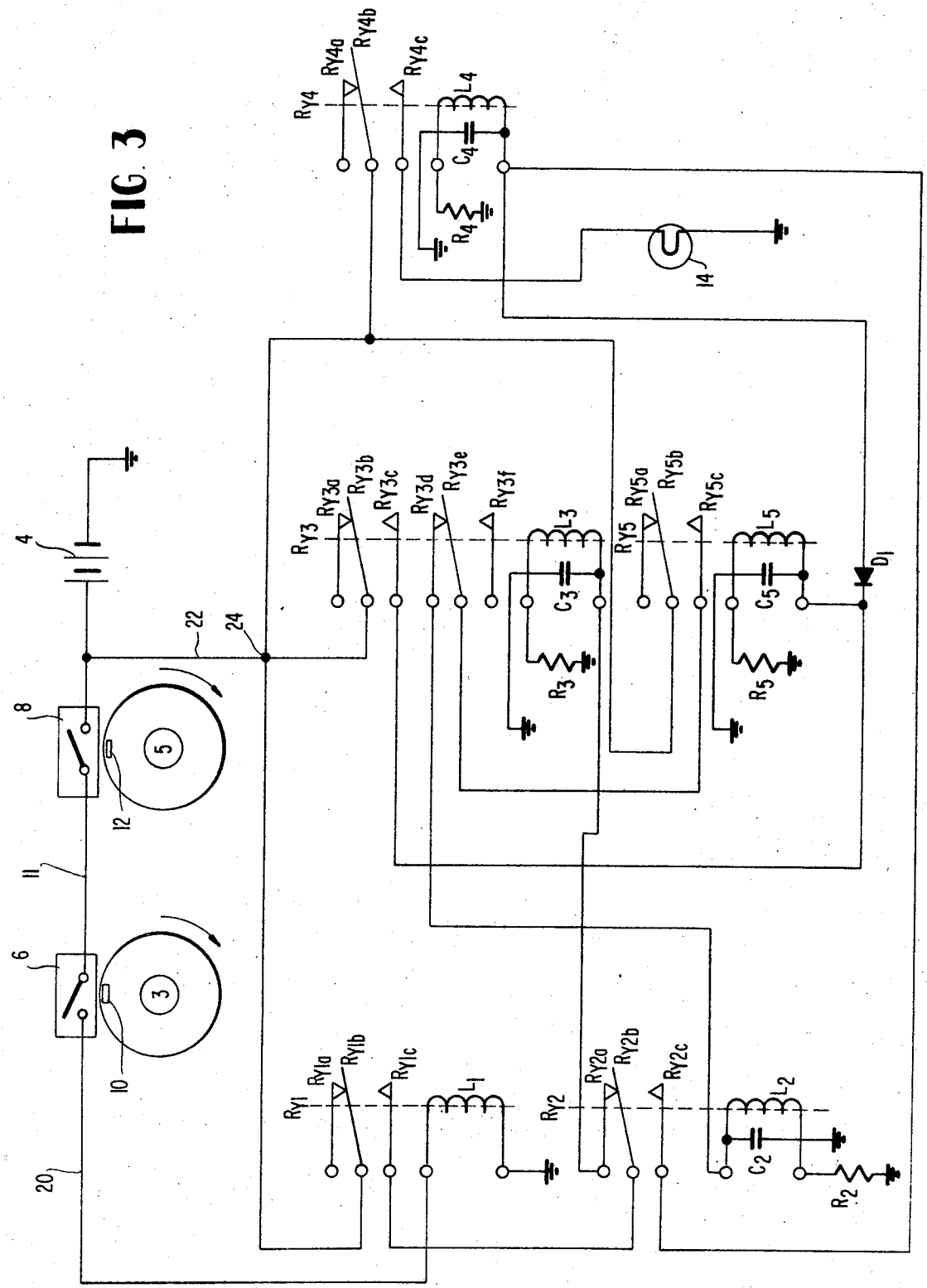
FIG. 3 illustrates a second embodiment of the invention.

A problem with the above-described embodiment is that it requires the driver's constant attention. FIG. 3 illustrates a second embodiment of the present invention using the phasing technique. This embodiment does not require the driver's constant attention. In accordance with the teachings of this embodiment, the lamp will light only when the phasing time decreases below a predetermined time period.

The operation of this system, illustrated in FIG. 3, will now be described. Like components in the figures are designated by common numerical designations. In brief, the circuit of FIG. 3 operates such that the first time wheels 3 and 5 are in phase, switches 6 and 8 close simultaneously. However, lamp 14 does not light. Lamp 14 will light only if the wheels become in phase again within a predetermined time after the initial in phase condition.

More specifically, the first time wheels 3 and 5 are in phase, switches 6 and 8 close simultaneously, allowing current to flow from source 4 to relay RY1. When no current is flowing in coil $L_1$, contact $RY1_b$ is positioned as indicated in the figure, in contact with $RY1_a$. When a current pulse from source 4 flows through coil $L_1$, contact $RY1_b$ is caused to momentarily move into contact with $RY1_c$, causing current to flow from source 4 through contact $RY2_a$ and $RY2_b$ to coil $L_3$ of relay RY3. Relay RY3 includes a storage capacitor $C_3$. When a current pulse is received in coil $L_3$, contact $RY3_b$ moves into contact with $RY3_c$ and contact $RY3_e$ moves into contact with $RY3_f$. Because of capacitor $C_3$, contacts $RY3_b$ and $RY3_e$ remain in their newly acquired position for an interval of time greater than the duration of the current pulse. This time is determined by the discharge time of capacitor $C_3$. The rate of discharge of capacitor $C_3$ is primarily determined by the time constant $R_3C_3$.

With contact $RY3_b$ in contact with $RY3_c$, current flows to coil $L_5$, causing contact $RY5_b$ to move to $RY5_c$. Capacitor $C_5$ prevents contact $RY5_b$ from immediately returning to contact with $RY5_a$. For purposes of illustration, it will be assumed that the time constant $R_5C_5$ provides a delay of six seconds. By making $R_5C_5$ much greater than $R_3C_3$, contact $RY3_e$ will have returned to fixed contact $RY3_d$ before contact $RY5_b$ returns to contact with $RY5_a$. In this manner, current flows from source 4, through $RY5_b$, $RY5_c$, $RY3_e$, $RY3_d$ to coil $L_2$. This activates relay RY2 causing contact $RY2_b$ to move to $RY2_c$. If wheels 3 and 5 do not return to a synchronized position within a time determined by the time constants $R_5C_5$ and $R_2C_2$, then contact $RY2_b$ returns to $RY2_a$ and the above-described process repeats itself the next time the wheels are in phase. At no time, however, has lamp 14 been lit.

However, let it be assumed that wheels 3 and 5 returned to an in phase position at a time before capacitor $C_2$ discharged. With $RY2_b$ in contact with $RY2_c$, wheel phasing causes current to flow from source 4 through contact $RY1_c$ of relay RY1 and contact $RY2_c$ of relay RY2 to coil $L_4$. The current in $L_4$ causes contact $RY4_b$ to move to $RY4_c$, thus permitting current to flow from source 4 to lamp 14. Lamp 14 lights, indicating a potentially dangerous condition.

Let it be assumed that relay RY5, when activated, causes contact $RY5_b$ to remain in contact with $RY5_c$ for 6 seconds. Let it further be assumed that capacitor $C_2$ stores enough charge to permit contact $RY2_b$ to remain in contact with $RY2_c$ for a period of time equal to approximately four seconds after contact $RY5_b$ is released. It now becomes clear that under such conditions the circuit just described defines a critical phasing time of 10 seconds. That is, if wheels 3 and 5 have a phasing time of greater than 10 seconds, lamp 14 remains dark. However, if they have a phasing time of less than 10 seconds, lamp 14 lights. Capacitor $C_4$ functions to produce a delay substantially equal to but less than the critical phasing interval. In this manner, when the phasing time is less than the critical time, lamp 14 produces a steady output since the next current pulse energizes $L_4$ before the lamp extinguishes.

When coil $L_4$ has been energized, current flows through diode $D_1$ to coil $L_5$ to start the phasing time interval running once again. If a third in phase signal is generated, coil $L_4$ is again energized as previously described. Were it not for the coupling between $L_4$ and $L_5$, coil $L_4$ would not be energized on the third pulse but on the fourth pulse.

In the above-described phasing technique, wheels 3 and 5 were assumed to be two rubber tired wheels on the moving vehicle, each serving as a reference for the other. However, the reference may take the form of the drive shaft of the vehicle. That is, to monitor wheel 3, activation means 12 would be mounted on the rotating drive shaft while pulse producing means 8 would be mounted at a stationary location within the vicinity of activation means 12 such that each rotation of the drive shaft closes the switch. The drive shaft will turn several times for each rotation of a wheel. The operation of the system remains the same, only the critical phasing time differs. In such an embodiment, a circuit as shown in FIG. 3 could be associated with each wheel with a separate light 14 monitoring each wheel. By labeling each light to designate the particular wheel to which it is associated, the driver can immediately determine which wheel is causing trouble.

Figure 4:
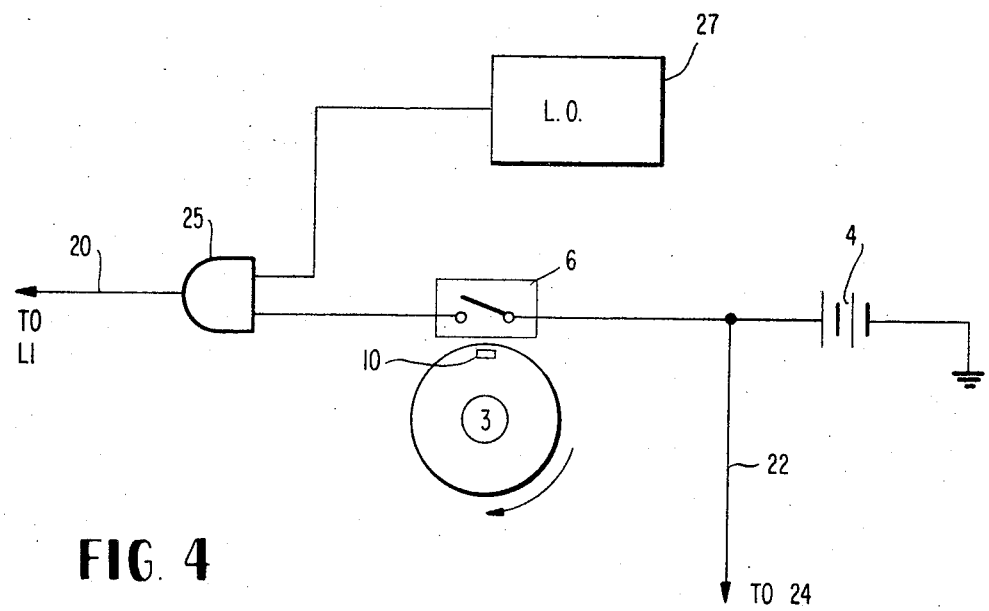
FIG. 4 illustrates the embodiment of FIG. 3 using a local oscillator.

In another embodiment of the invention using the phasing technique, the reference signal against which a monitored wheel judges its radius change is generated by a local oscillator. FIG. 4 illustrates that portion of FIG. 3 comprising the wheels 3, 5 as modified to incorporate a local oscillator. Wheel 3 and its associated pulse producing means 6 and activation means 10 remain unchanged. However, an in phase condition between the monitored wheel and the local oscillator is indicated by using AND gate 25. When the pulse producing means 6 is closed, in coincidence with a pulse from oscillator 27, a pulse appears at the output of the gate 25. The remaining portion of FIG. 3 operates in the manner previously disclosed.

Figure 5:
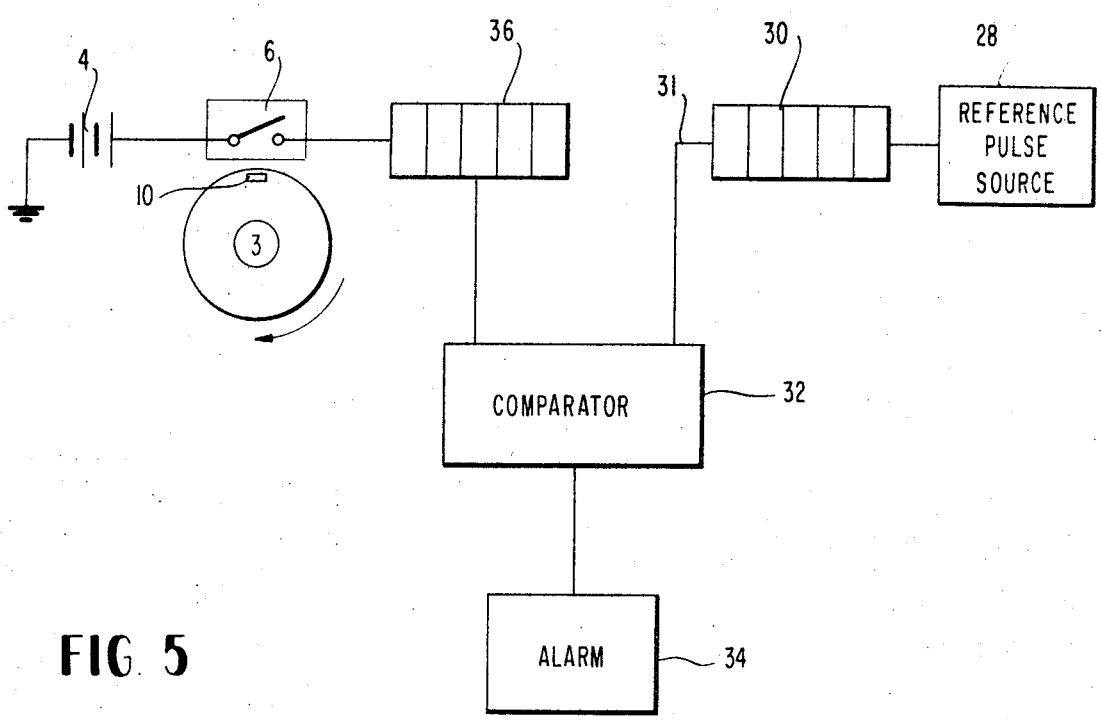
FIG. 5 illustrates another embodiment of the invention.

Rather than calculating the phasing time, a critical wheel condition can be determined by counting the actual number of rotations of the monitored wheel over a predetermined time interval. FIG. 5 illustrates an embodiment of the invention using actual counts of the wheel rotation. Wheel 3 represents the monitored wheel. Reference pulse source 28 may be another wheel on the vehicle or the drive shaft adapted as previously described to produce a number of pulses proportional to the number of wheel revolutions. Source 28 may also be a local oscillator. In operation, when wheel 3 begins to rotate, source 28 begins to generate reference pulses. Each pulse from source 28 increments counter 30. After a predetermined number of counts, for example 100, the counter produces an output on line 31.

Simultaneously, each rotation of wheel 3 closes switch 6 causing a current pulse from source 4 to increment counter 36. Comparator 32 receives signals from counters 36 and 30. The output from counter 30 representing the predetermined count is compared in comparator 32 with the count in counter 36. Let it again be assumed that counter 30 generates a signal representing a count of 100. Comparator 32 may then be set to produce an output signal to alarm 34 if counter 36 counts less than 97 or more than 103. Upon receiving a signal from the comparator, the alarm 34 is activated, thus warning the driver of an impending problem. An alarm and comparator may be associated with each wheel on the vehicle.

In still another embodiment, the speed of each monitored wheel is directly measured using a tachometer generator mounted in direct contact with the wheel. The wheel speed is compared with a reference speed. When the difference falls outside predetermined limits, an alarm sounds.

Although the invention has been described with respect to the preferred embodiments thereof, it is understood by those skilled in the art that various modifications can be made in construction and arrangement within the scope of the invention as defined in the appended claims.

What is claimed is:

1. A system for monitoring the radius of rubber tired wheels mounted on a vehicle as the vehicle is moving comprises:
   a. means mounted on at least two monitored wheels for indicating when its corresponding wheel has completed a full rotation; and
   b. means generating an in-phase signal each time the indicating means on said at least two wheels are simultaneously activated, the time interval between in-phase signals being an indication of the effective radius of each wheel in relation to the other monitored wheels on the same vehicle.

2. The system of claim 1 further including means responsive to the in-phase signals for generating a warning signal when the time between successive in-phase signals is less than a predetermined time.

3. The system of claim 2 wherein said means responsive to said in-phase signals includes first relay means energized in response to each in-phase signal; second relay means energized in response to the energization of said first relay means, said second relay means including a delay means for causing said second relay means to remain in an energized state for a first time interval; third relay means energized in response to the energization of said second relay means, said third relay means including a delay means for causing said third relay means to remain energized for a second time interval; and means coupled to said third relay means for generating a warning signal in response to the generation of at least two successive in-phase signals within a time interval less than said predetermined time, said predetermined time corresponding to the sum of said first and second time intervals.

4. The system of claim 3 wherein said means for indicating includes a switch mounted on a stationary position adjacent to each monitored wheel and an activation means mounted on a rotating portion of each monitored wheel for closing said switch at least once during each full revolution of the wheel.

5. The system of claim 4 wherein said switch is a reed switch and said activation means is a magnet.

6. As system for detecting a potentially dangerous condition of a rubber tired wheel mounted on a moving vehicle comprising:
   a. means mounted on said wheel producing signals in response to the rotation of the wheel;
   b. means generating reference signals; and
   c. means responsive to said reference signals and said signals in response to the wheel rotation for producing an in-phase signal upon the simultaneous occurrence of a reference signal and a signal in response to the wheel rotation and means responsive to said in-phase signals for generating a warning signal when the time interval between in-phase signals is less than a predetermined time, said warning signal indicating that the radius of said wheel has changed beyond a predetermined limit.

7. The system of claim 6 wherein said means for generating reference signals comprises an oscillator.

8. The system of claim 6 wherein said means for generating a reference signal comprises another wheel mounted on said moving vehicle and means mounted on said another wheel for producing signals in response to the rotation of the wheel.

* * * * *